(12) United States Patent
Ota et al.

(10) Patent No.: US 10,350,804 B2
(45) Date of Patent: Jul. 16, 2019

(54) MOLDING MACHINE, CONTROL APPARATUS, AND MOLDING APPARATUS

(71) Applicant: OMRON Corporation, Kyoto (JP)

(72) Inventors: Morihisa Ota, Kusatsu (JP); Koji Hayashi, Otsu (JP)

(73) Assignee: OMRON Corporation, Kyoto (JP)

( * ) Notice: Subject to any disclaimer, the term of this patent is extended or adjusted under 35 U.S.C. 154(b) by 228 days.

(21) Appl. No.: 15/382,726

(22) Filed: Dec. 18, 2016

(65) Prior Publication Data

US 2017/0232651 A1     Aug. 17, 2017

(30) Foreign Application Priority Data

Feb. 15, 2016     (JP) .................. 2016-025595

(51) Int. Cl.
    *B29C 45/76*    (2006.01)
    *B29C 45/18*    (2006.01)
    *B29C 45/77*    (2006.01)

(52) U.S. Cl.
CPC .......... *B29C 45/7646* (2013.01); *B29C 45/18* (2013.01); *B29C 45/766* (2013.01); *B29C 45/77* (2013.01); *B29C 2945/7605* (2013.01); *B29C 2945/7619* (2013.01); *B29C 2945/76193* (2013.01); *B29C 2945/76374* (2013.01); *B29C 2945/76474* (2013.01); *B29C 2945/76498* (2013.01); *B29C 2945/76545* (2013.01); *B29C 2945/76658* (2013.01); *B29C 2945/76859* (2013.01); *B29C 2945/76939* (2013.01)

(58) Field of Classification Search
CPC ............... B29C 45/7646; B29C 45/77; B29C 2945/7605; B29C 2945/76474
See application file for complete search history.

(56) References Cited

U.S. PATENT DOCUMENTS 7,350,367 B2 * 4/2008 Matsiev ................ G01N 9/002
    62/129

FOREIGN PATENT DOCUMENTS

| DE | 7009447 | 8/1972 |
|----|---------|--------|
| JP | S5131356 | 9/1976 |
| JP | S6125816 | 2/1986 |
| JP | H05-329864 | 12/1993 |
| JP | H06174625 | 6/1994 |
| JP | 2006-137057 | 6/2006 |
| JP | 2015-066700 | 4/2015 |
| JP | 2015132570 | 7/2015 |
| WO | 2015017643 | 2/2015 |

OTHER PUBLICATIONS

Kobayashi et al., "High temperature ultrasonic transducers for monitoring of micro-molding," IEEE Ultrasonics Symposium proceedings, Oct. 5, 2003, pp. 693-698.

(Continued)

*Primary Examiner* — James Sanders
(74) *Attorney, Agent, or Firm* — JCIPRNET (57) ABSTRACT

The present invention provides a molding machine that can easily detect viscosity of resin in a cylinder without advance preparations. An injection molding machine (10) includes an ultrasonic viscosity sensor (20), and the ultrasonic viscosity sensor (20) includes an ultrasonic vibration portion in contact with resin filled in a cylinder (12).

6 Claims, 7 Drawing Sheets

(56) References Cited

OTHER PUBLICATIONS

"Search Report of Europe Counterpart Application", dated Jul. 12, 2017, p. 1-p. 8, in which the listed references were cited.
"Office Action of China Counterpart Application," with English translation thereof, dated Sep. 5, 2018, p. 1-p. 15.
Office Action of Japan Counterpart Application, with English translation thereof, dated Oct. 9, 2018, pp. 1-9.

* cited by examiner

MOLDING MACHINE, CONTROL APPARATUS, AND MOLDING APPARATUS

CROSS-REFERENCE TO RELATED APPLICATION

This application claims the priority benefit of Japanese application serial no. 2016-025595, filed on Feb. 15, 2016. The entirety of the above-mentioned patent application is hereby incorporated by reference herein and made a part of this specification.

BACKGROUND OF THE INVENTION

1. Field of the Invention

The present invention relates to a molding machine for manufacturing a resin product, a control apparatus, and a molding apparatus.

2. Description of Related Art

Melt viscosity of resin used in resin molding such as, representatively, injection molding greatly differs from each other. A known reason includes a molecular difference generated in a macromolecule polymerization process when resin material makers manufacture resin. Further, a difference in a quantity of flame retardants, coloring agents, and intensifying agents such as glass fillers that are added to resin materials, and a difference in distribution statuses of the flame retardants, the coloring agents, the intensifying agents in the resin materials also belong to main factors that result in the difference in the melt viscosity of the resin. Due to the difference in the melt viscosity of the resin, various undesirable cases such as a defect in dimensional stability of products are caused.

The resin has the following characteristic: If the resin is placed at a normal atmospheric temperature, the resin absorbs moisture. Therefore, the viscosity of the resin becomes lower during melting, and the resin flows easily consequently. Therefore, usually, resin is exposed at a temperature of approximately 100° C. for hours before use of the resin, to evaporate moisture absorbed by the resin. However, due to an operation miss or an apparatus trouble in this case, products are often molded without full evaporation of moisture from the resin. This also belongs to the main factors that result in undesirable cases of products.

Further, it is also known that a temperature distribution in a cylinder of a molding machine changes due to a seasonal temperature change or a temperature change of a day. Therefore, even if a setting value of a temperature in the cylinder is set to a same condition, a temperature of melt resin in the cylinder differs in a cold environment and in a hot environment. Due to the temperature difference of the melt resin, melt viscosity of the resin also differs. Therefore, this also belongs to the main factors that result in various undesirable cases such as a defect in dimensional stability of products.

To deal with the undesirable cases caused due to the difference in the viscosity of the resin, various technologies have been provided. The patent literature 1 to the patent literature 3 are used as examples.

However, in technologies of the patent literature 1, resin is shot when a nozzle of a molding machine is separated from a mold, and therefore, viscosity of resin cannot be detected in real time. That is, mass production of products needs to be stopped to detect the viscosity of the resin. Further, the viscosity of the resin is different from viscosity of actual shot resin that occurs when resin products are obtained, and the viscosity of the resin is detected when the nozzle of the molding machine is separated from the mold. Therefore, it is difficult to keep a status of the resin state completely consistent with a status of the actual shot resin. Therefore, the viscosity of the actual shot resin may not be detected accurately. Moreover, poor production efficiency may be caused. For example, an operation of removing the shot resin may be added.

In technologies of the patent literature 2, during viscosity detection of resin, a block used for the detection needs to be configured to replace a mold and disposed in a molding machine. Therefore, it is difficult to detect the viscosity of the resin during mass production of products.

In technologies of the patent literature 3, viscosity of resin is calculated by detecting a pressure difference of melt resin during injection. That is, the viscosity of the resin cannot be detected if the resin is not shot. Therefore, a molding condition that corresponds to the viscosity of the resin cannot be set each time the resin is shot. Further, if a small quantity of resin is shot, resin flowing to the outside is scarce, and the injection ends before pressure is stable. Therefore, the viscosity cannot be calculated accurately. Moreover, to improve the precision of the calculation of the viscosity, a cross-sectional area of a flow path of pressure sensor needs to be decreased and a length of the flow path needs to be increased, so as to increase the pressure difference. A heavier pressure loss is caused if the cross-sectional area is decreased. Therefore, injection quality is affected. Further, a molding machine becomes larger if a long flow path is used, thereby causing a problem about disposing space or other undesirable cases.

In other technologies, the following methods are also considered. An ultrasonic wave is emitted to melt resin in a cylinder of a molding machine, so as to detect a response time of the acoustic wave and phase offset of the acoustic wave, and detect viscosity of the melt resin based on this basis. In the method, in principle, the viscosity may be detected before the resin is about to be shot, and an injection condition may be changed in real time according to a result of the detection each time the resin is shot.

LITERATURE IN THE PRIOR ART

Literature

Patent literature 1: Japan patent gazette No. 2015-66700 (Disclosed on Apr. 13, 2015)
Patent literature 2: Japan patent gazette No. 2006-137057 (Disclosed on Jun. 1, 2006)
Patent literature 3: Japan patent gazette No. 5-329864 (Disclosed on Dec. 14, 1993)

SUMMARY OF THE INVENTION

Subject to be Resolved in the Invention

However, to detect viscosity by emitting an ultrasonic wave, data about a temperature characteristic of the viscosity and about a frequency characteristic of the viscosity need to be obtained in advance with respect to each grade of resin. In this case, the data to be obtained is basic data used during the viscosity detection. Therefore, the data needs to be obtained accurately. Moreover, data with respect to grades of all resin used for injection molding needs to be further obtained respectively. Therefore, the obtaining of the data requires an enormous time and effort, and is impractical.

The present invention is directed to the subject. Moreover, the present invention is directed to a molding machine that can easily detect viscosity of resin in a cylinder without advance preparations.

The Technical Means for Resolving the Subject

A molding machine according to a first form of the present invention includes: a cylinder; a pressurization portion, applying pressure to resin for releasing the resin filled in the cylinder to the outside of the cylinder; and an ultrasonic viscosity sensor, including an ultrasonic vibration portion in contact with the resin filled in the cylinder.

According to the structure, the ultrasonic viscosity sensor detects the viscosity of the resin in such a manner that the ultrasonic vibration portion is in direct contact with the melt resin. Therefore, regardless of types of the resin, actual viscosity that corresponds to a physical status of object resin to be detected can be directly detected. Therefore, there is no need to obtain in advance various characteristics that are related to viscosity of resin used for injection molding. Therefore, the viscosity of the resin in the cylinder can be easily detected without advance preparations. That is, compared with a molding machine in the prior art that detects viscosity by emitting an ultrasonic wave, the molding machine including the ultrasonic viscosity sensor has high practicality.

A molding machine according to a second form of the present invention is based on the first form, where the ultrasonic viscosity sensor is installed on a side portion of the cylinder.

According to the structure, the ultrasonic viscosity sensor can be installed in the molding machine without cable distribution inside the cylinder.

A molding machine according to a third form of the present invention is based on the first form, where the ultrasonic viscosity sensor is installed at a front end of the pressurization portion.

According to the structure, the ultrasonic viscosity sensor can be installed in the molding machine without changing the cylinder.

A molding machine according to a fourth form of the present invention is based on the third form, where the ultrasonic viscosity sensor is installed in such a manner that an axis of the ultrasonic vibration portion is parallel with an axis of the pressurization portion.

When the ultrasonic vibration portion and the pressurization portion each are in a shape of an elongated stick, their axes refer to axes in a length direction. Therefore, according to the structure, less pressure may be applied to the ultrasonic vibration portion when the cylinder is filled with the resin. As a result, the viscosity of the resin can be detected more stably.

A molding machine according to a fifth form of the present invention is based on any one of the first form to the fourth form, where the molding machine is a injection molding machine.

According to the structure, an injection molding machine that can easily detect viscosity of resin in a cylinder without advance preparations is implementable.

A control apparatus according to a sixth form of the present invention is a control apparatus configured to control the molding machine according to any one of the first form to the fifth form, including a setting portion, setting a releasing condition that corresponds to viscosity of the resin detected by the ultrasonic viscosity sensor.

According to the structure, an optimal releasing condition that corresponds to a detected viscosity value can be set.

A control apparatus according to a seventh form of the present invention is based on the sixth form, where the setting portion sets at least any one of a releasing speed, releasing pressure, retaining pressure, and a pressure retaining time in the releasing condition to a value that corresponds the detected viscosity of the resin.

According to the structure, various optimal releasing conditions may be suitably set according to detected viscosity value.

A control apparatus according to an eighth form of the present invention is based on the sixth form or the seventh form, where the releasing condition is set before the resin is released, according to viscosity of the resin detected at any occasion that is after measurement of the resin by the molding machine and that is before the releasing of the resin.

According to the structure, an optimal releasing condition can be set before the releasing of the resin according to the viscosity of the resin detected in real time. Therefore, resin can be released at an optimal condition that corresponds to viscosity of the resin to be released. Therefore, quality of products manufactured by the molding machine is stable.

A molding apparatus according to a ninth form of the present invention includes: the molding machine according to any one of the first form to the fifth form, and the control apparatus according to any one of the sixth form to the eighth form.

According to the structure, a molding apparatus that can easily detect viscosity of resin in a cylinder without advance preparations is implementable.

Effect of the Invention

According to an aspect of the present invention, a molding machine that can easily detect viscosity of resin in a cylinder without advance preparations is implementable.

BRIEF DESCRIPTION OF THE DRAWINGS

FIG. 4(a) to FIG. 4(e) are a diagram of motions of the injection molding machine that occur during one molding injection according to the implementation manner 1 of the present invention.

DESCRIPTION OF THE EMBODIMENTS (Implementation Manner 1)

The following describes the implementation manner 1 of the present invention with reference to FIG. 1 to FIG. 7(a) and FIG. 7(b).

(Structure of an Injection Molding Apparatus 1)

Figure 1:
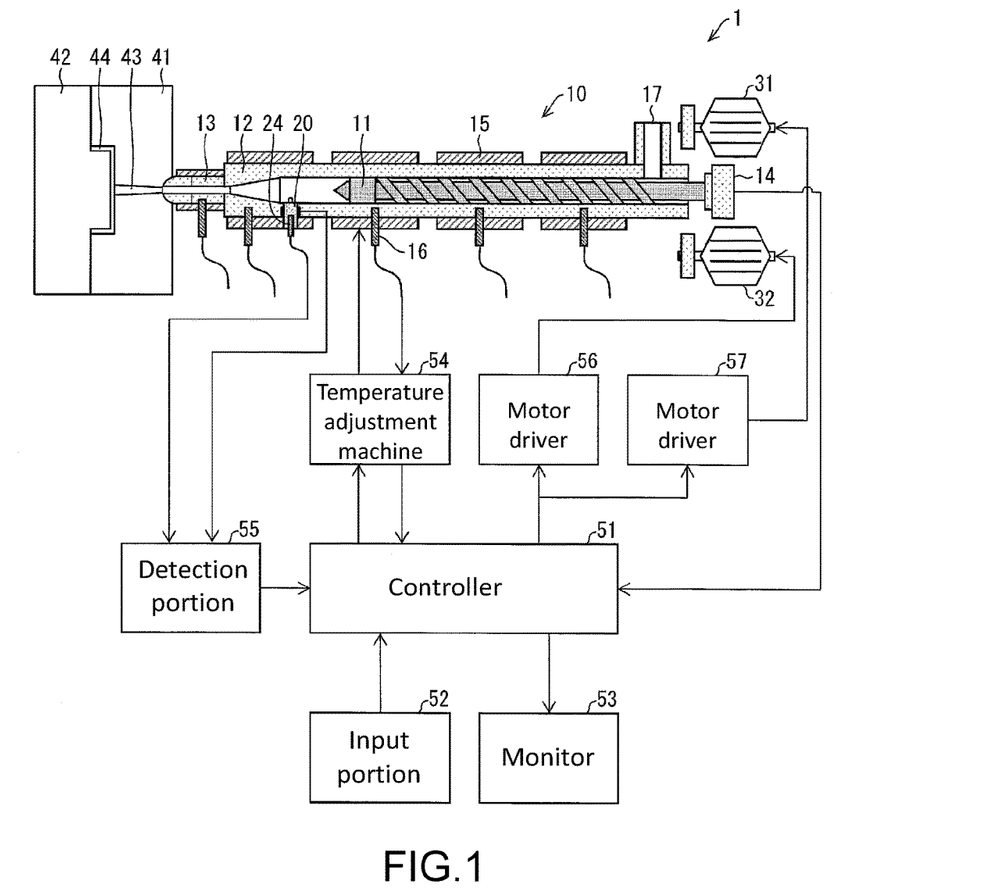
FIG. 1 is diagram of a structure of an injection molding apparatus according to an implementation manner 1 of the present invention.

FIG. 1 is diagram of a structure of the injection molding apparatus 1 according to the implementation manner 1 of the present invention. As shown in the figure, the injection molding apparatus 1 includes an injection molding machine 10, an injection motor 31, a measurement motor 32, a fixing mold 41, a movable mold 42, a controller 51 (control apparatus and a setting portion), an input portion 52, a monitor 53, a temperature adjustment machine 54, a detection portion 55, a motor driver 56, and a motor driver 57.

The injection molding machine 10 includes a screw 11 (pressurization portion), a cylinder 12, a nozzle 13, a load cell 14, a heater 15, a thermocouple 16, a hopper opening 17, and an ultrasonic viscosity sensor 20.

The input portion 52 is an element (device) such as a touch panel or a pressing button used for inputting information to the injection molding apparatus 1. The monitor 53 is an element such as a liquid crystal display for displaying the information.

The hopper opening 17 is configured to inject pellet resin used in injection molding into an injection inlet in the cylinder 12. The resin is a material for forming a resin product. A resin pellet injected into the cylinder 12 through the hopper opening 17 is heated by a heater 15 and is melt. The melt resin is processed by means of the following measurement and then is filled in an interior gap of the injection molding machine 10.

The load cell 14 detects pressure applied to the resin in the cylinder 12, and notifies the controller 51 of a result.

The fixing mold 41 and the movable mold 42 constitute a mold configured to manufacture a product. The fixing mold 41 is installed in the nozzle 13. A spool runner 43 is formed at a position that is in the fixing mold 41 and that corresponds a front end of the nozzle 13. The movable mold 42 is installed in the fixing mold 41. When the movable mold 42 is installed in the fixing mold 41, a gap 44 is formed between the fixing mold 41 and the movable mold 42. One end of the spool runner 43 is connected to an injection opening of the nozzle 13 and the other end is connected to the gap 44. By means of such structures, during injection of resin, the resin in the cylinder 12 passes through the spool runner 43 from the front end of the nozzle 13 and then is filled in the gap 44.

The controller 51 controls all injection molding processing of the injection molding apparatus 1. During the measurement of the resin, the controller 51 controls the measurement motor 32 by using the motor driver 56, to enable the screw 11 to rotate. Therefore, the melt resin moves to the front of the cylinder 12. As a result, the melt resin is filled in a gap in the cylinder 12. Moreover, by means of the filling, the screw 11 is pushed to move to the rear of the cylinder 12.

During the injection of the resin, the controller 51 controls the injection motor 31 by using the motor driver 57, to enable the screw 11 to move forward. On such basis, specified pressure is applied to the resin for releasing the filled resin to the outside of the cylinder 12. Therefore, resin in the screw 11 is shot to the mold gap 44 through the spool runner 43.

In this way, the "injection" in this implementation manner means releasing a specified quantity of melt resin filled in the cylinder 12 to the outside of the cylinder 12 by means of pressure, so as to inject the resin into the gap 44 between the fixing mold 41 and the movable mold 42. That is, the "injection of the resin" in this implementation manner is a specific example of the "releasing of the resin".

The temperature adjustment machine 54 adjusts a temperature in the cylinder 12 by controlling the heater 15. The thermocouples 16 are respectively paired with the heaters 15. The temperature adjustment machine 54 can obtain a current temperature of the cylinder 12 by using the thermocouple 16. The temperature adjustment machine 54a monitors a change of the current temperature obtained from the thermocouple 16, and at the same time, suitably controls the heater 15 to make the cylinder 12 at a needed temperature.

The detection portion 55 obtains viscosity of the resin in the cylinder 12 that is detected by the ultrasonic viscosity sensor 20. When ultrasonic viscosity sensor 20 includes a temperature sensor 24, the detection portion 55 also obtains a temperature of resin detected by the temperature sensor 24. The detection portion 55 rectifies the obtained viscosity by using the temperature obtained by the temperature sensor 24, so as to determine a detected viscosity value. The viscosity of the resin may be detected more accurately by means of the rectification. In addition, the detection of a temperature by the temperature sensor 24 may not be necessary, and the detection portion 55 may also use the viscosity detected by the ultrasonic viscosity sensor 20, as detected viscosity.

(Structure of the Ultrasonic Viscosity Sensor 20)

Figure 2:
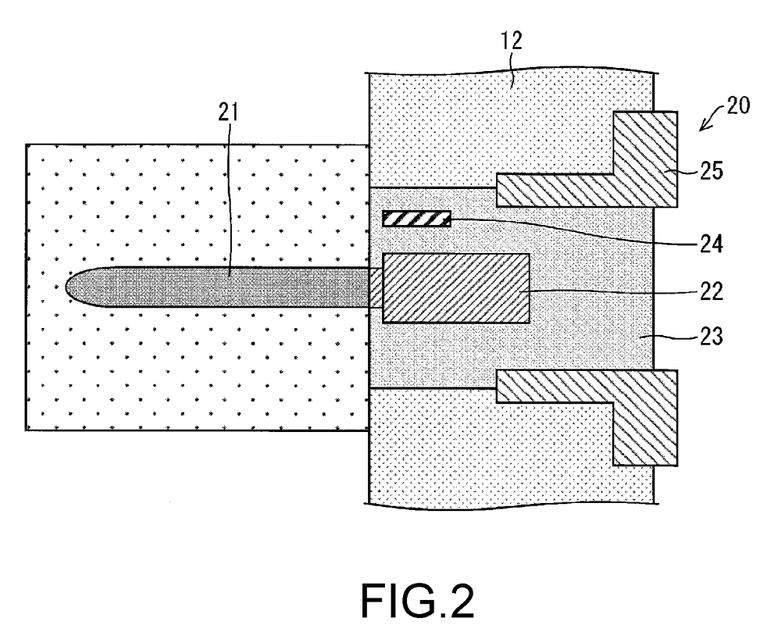
FIG. 2 is a diagram of a detailed structure of an ultrasonic viscosity sensor installed in an injection molding machine according to the implementation manner 1 of the present invention.

FIG. 2 is a diagram of a detailed structure of the ultrasonic viscosity sensor 20 installed in the injection molding machine 10 according to the implementation manner 1 of the present invention. As shown in the figure, the ultrasonic viscosity sensor 20 includes an ultrasonic vibration portion 21, an oscillator 22, a base 23, and the temperature sensor 24.

The ultrasonic viscosity sensor 20 is installed on a side portion (wall portion) of the cylinder 12 by using a retaining bolt 25. The ultrasonic viscosity sensor 20 is installed at a position other than a movable range of the screw 11 in such a manner that the ultrasonic viscosity sensor 20 is not in contact with the screw 11 in the cylinder 12. That is, the ultrasonic vibration portion 21 does not come into contact with the screw 11 even if the screw 11 moves to an uttermost front. If this condition can be satisfied, the ultrasonic viscosity sensor 20 may be installed, for example, at any position that is from a place near the front end of the nozzle 13 to a place near a front end of the screw 11 that occurs when the screw 11 moves to the uttermost front.

The oscillator 22 and the temperature sensor 24 are embedded in the base 23, and the ultrasonic vibration portion 21 is installed on one end of the oscillator 22. As shown in FIG. 2, the ultrasonic vibration portion 21 is in a shape of an elongated stick, and is configured by protruding from the base 23 into the gap filled with the resin in the cylinder 12. Therefore, the ultrasonic vibration portion 21 is physically (that is, directly) in contact with the resin filled in the cylinder 12.

Viscosity detection of resin using the ultrasonic viscosity sensor 20 is performed in the following manner. When the ultrasonic vibration portion 21 is in contact with melt resin, the oscillator 22 generates ultrasonic vibration. On such basis, the ultrasonic vibration portion 21 generates torsional vibration. In this case, due to viscosity resistance of the resin, the vibration of the ultrasonic vibration portion 21 is restricted and therefore amplitude of the ultrasonic vibration portion 21 is decreased. A fixed amplitude circuit that is included by the ultrasonic viscosity sensor 20 and that is not shown in the figure increases input power of the oscillator 22, to release a vibration force of the ultrasonic vibration portion 21 that is restricted by the viscosity resistance of the resin. The ultrasonic viscosity sensor 20 detects the input power in this case, converts the input power into viscosity, and outputs the viscosity to the detection portion 55.

Transferring rates and attenuation rates of ultrasonic wave vibration of the oscillator 22 and the ultrasonic vibration portion 21 change as an environmental temperature changes. Therefore, the temperature sensor 24 is configured to detect an environmental temperature of the ultrasonic viscosity sensor 20, and outputs the environmental temperature to the detection portion 55. As described above, the detection portion 55 rectifies, according to a detected temperature value output by the temperature sensor 24, a detected viscosity value output by the ultrasonic viscosity sensor 20, so as to obtain a more accurate detected viscosity value.

(Injection Molding Procedure)

Figure 3:
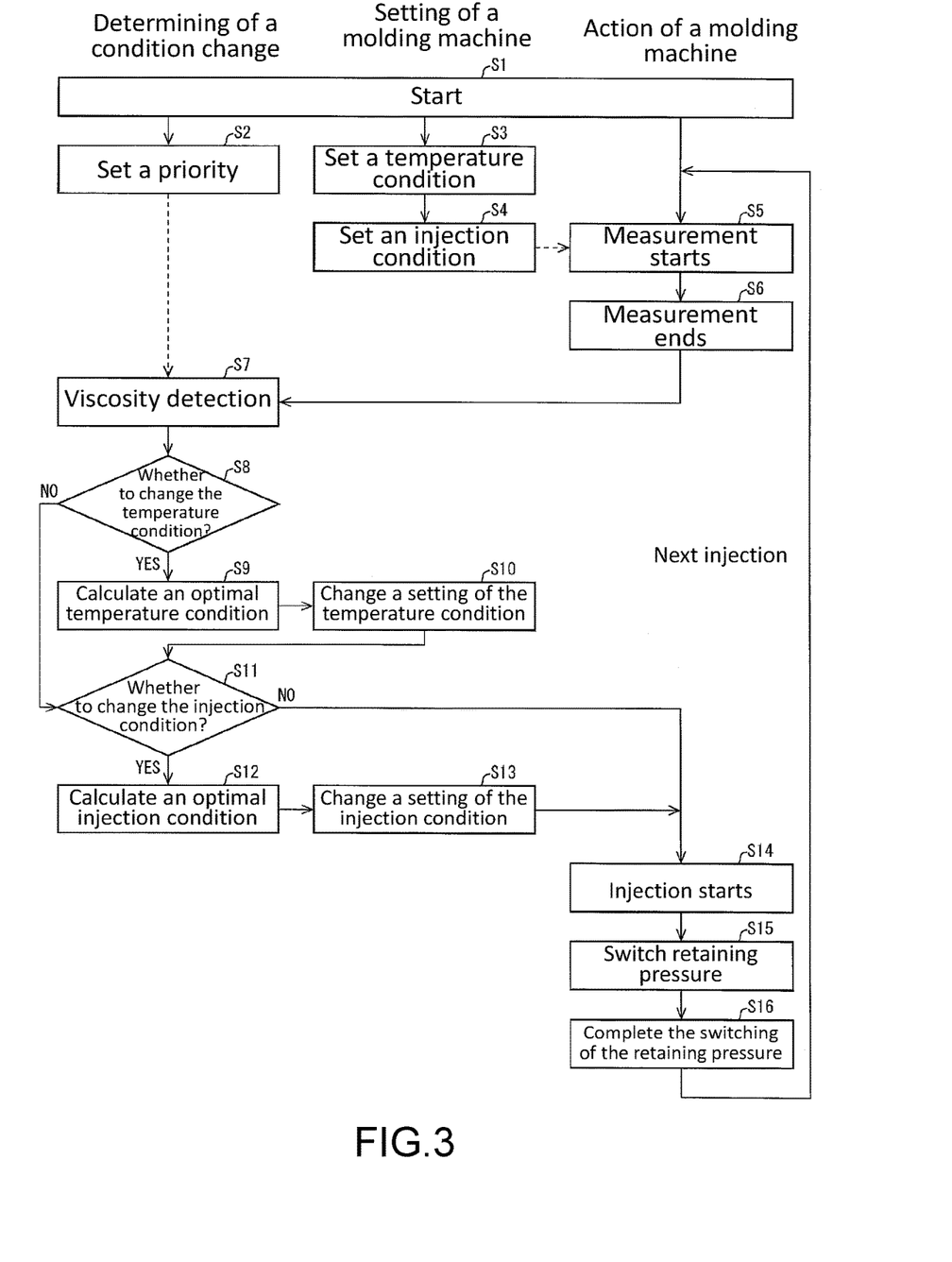
FIG. 3 is a flowchart of a processing procedure during injection molding of the injection molding apparatus according to the implementation manner 1 of the present invention.
Figure 4:
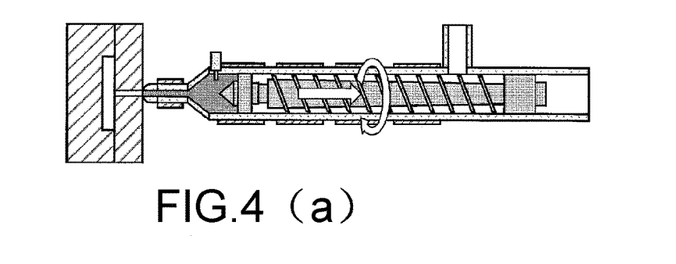
Figure 5:
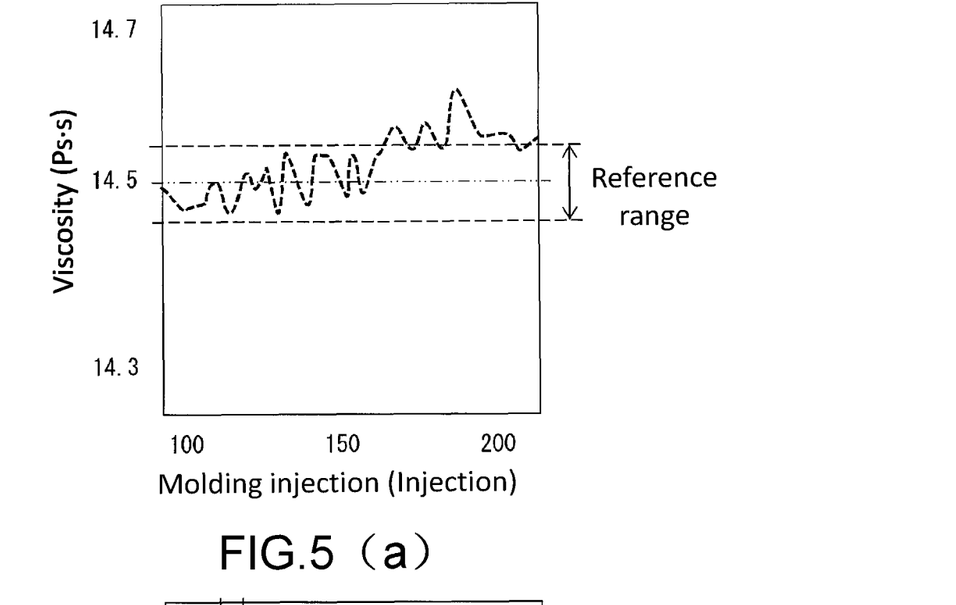
FIG. 5(a) is a chart of an example of a viscosity change that occurs during each molding injection.
FIG. 5(b) is a chart of a relationship between a detected viscosity value and setting retaining pressure.
Figure 6:
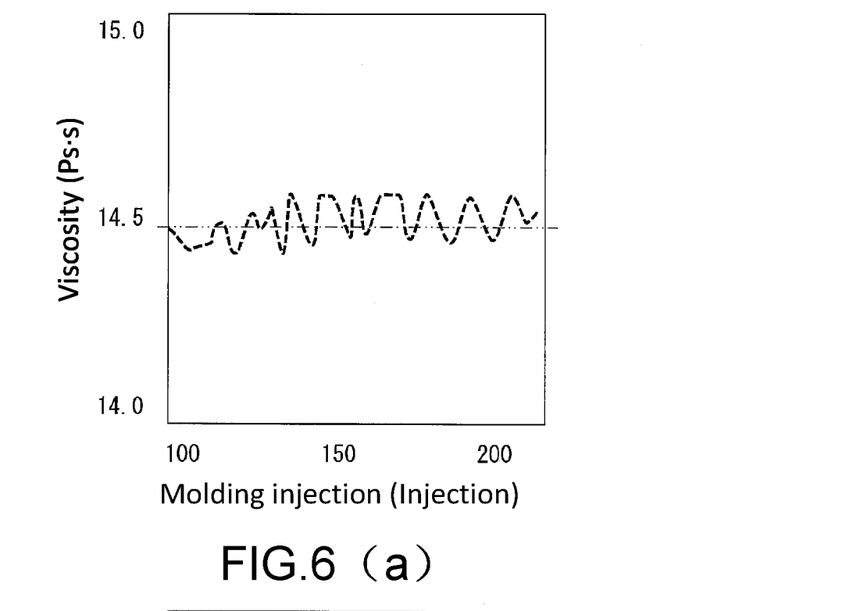
FIG. 6(a) is a chart of an example of a change of a detected viscosity value that occurs during each molding injection when a temperature condition is not changed.
FIG. 6(b) is a chart of an example of a change of a detected viscosity value that occurs during each molding injection when a temperature condition is changed.

FIG. 3 is a flowchart of a processing procedure during injection molding of the injection molding apparatus 1 according to the implementation manner 1 of the present invention. As shown in the figure, the injection molding apparatus 1 (S1) is started. Subsequently, a user of the injection molding apparatus 1 sets, for the injection molding apparatus 1, a priority (S2) of an injection condition (releasing condition) that is used for changing a setting according to detected viscosity. The injection condition that may be set for the injection molding apparatus 1 may be, for example, an injection speed (releasing speed), injection pressure (releasing pressure, injection peak pressure), retaining pressure, a pressure retaining time, and the like. The user sets priorities for them.

Next, the user respectively sets default temperature conditions and injection conditions (S3, S4) for the injection molding apparatus 1 according to types of resin used in injection molding of a product. After the setting is completed, the controller 51 enables measurement (S5) of resin by the injection molding machine 10. When the measurement of the resin is completed (S6), before resin filled in the cylinder 12 is shot, the detection portion 55 detects viscosity of the resin by using the ultrasonic viscosity sensor 20 (S7). The detection portion 55 notifies the controller 51 of the detected viscosity of the resin.

The controller 51 determines, based on the detected viscosity, whether to change a temperature condition of the injection molding (S8). If S8 is YES, the controller 51 calculates an optimal temperature condition (S9) that corresponds to the detected viscosity, and sets the injection molding apparatus 1. Specifically, the temperature adjustment machine 54 is instructed to change a temperature of the heater 15 to a temperature that corresponds to the detected viscosity value. After receiving the indication, the temperature adjustment machine 54 controls the heater 15 until the temperature of the heater 15 changes to the indicated temperature.

If S8 is NO or after S10 is performed, the controller 51 determines, based on detected viscosity, whether to change the injection condition of the injection molding (S11). For example, if the detected viscosity falls within a reference range, the controller 51 determines not to change the injection condition; otherwise, if the viscosity exceeds a reference range, the controller 51 determines to change the injection condition.

If S11 is yes, the controller 51 calculates an optimal injection condition that corresponds to the detected viscosity (S12). In this case, the controller 51 sets a injection condition of a calculation object to an injection condition whose priority is the highest in the injection conditions such as the injection speed. For example, if a highest priority is set for the injection speed specified, the controller 51 calculates an optimal injection speed that corresponds to the detected viscosity.

The controller 51 changes a setting of the injection condition (S13). That is, a current injection condition is changed to a new calculated injection condition. On such basis, when a new injection speed that corresponds to the detected viscosity is calculated, for example, the new injection speed is set as a injection speed applicable to current and subsequent molding injection.

If S11 is no or after S13 is performed, the controller 51 enables injection of resin by the injection molding machine 10. If a new injection speed that corresponds to a detected value of current viscosity of filled resin is set for the injection molding apparatus 1 in S13, the resin is shot at the injection speed. Therefore, resin can be shot (released) at a suitable injection speed that corresponds to viscosity of the filled resin that occurs before the molding injection. As a result, melt resin can be filled in the gap 44 suitably.

After the injection of the resin is completed, retaining pressure in the cylinder 12 is switched. Herein, if new retaining pressure that corresponds to a current detected viscosity value of the filled resin is set for the injection molding apparatus 1 in S13, interior pressure of the cylinder 12 is switched to the retaining pressure after the injection of the resin is completed. Therefore, the cylinder 12 can be kept at suitable pressure that corresponds to the viscosity of the shot resin. As a result, suitable pressure that corresponds to viscosity of the resin in the gap 44 can be applied to the gap 4. Therefore, quality of a resin product is stable.

When pressure retaining is completed (S16), processing in FIG. 3 is returned to S5. Then, next molding injection is performed. In this way, the injection molding apparatus 1 repeatedly performs molding injection, so as to constantly manufacture resin products.

(Motions of the Injection Molding Apparatus 10)

FIG. 4(a) to FIG. 4(e) are a diagram of the motions of the injection molding machine that occur during one molding injection according to the implementation manner 1 of the present invention.

As shown in FIG. 4(a) to FIG. 4(e), during one molding injection, a quantity of resin needed by the molding injection is measured first. Specifically, the resin is injected from the hopper opening 17. The heater 15 performs heating and at the same time, the screw 11 rotates (FIG. 4(a)). Therefore, resin that is heated by the heater 15 to become melt moves to and is filled in the front of the cylinder 12. As a result, the screw 11 is pushed by the moving resin to move to the rear. When a preset quantity of resin is filled in the cylinder 12, the resin measurement is completed (FIG. 4(b)).

After the resin measurement is completed, viscosity in the cylinder 12 is detected before injection. The viscosity of the resin may be detected at any occasion that is after the measurement of the resin and that is before the injection of the resin. After the viscosity detection, a setting of a temperature condition or an injection condition needs to be changed according to a need. Subsequently, the screw 11 is made to move forward, and therefore, the resin starts to be shot to the gap 44 (FIG. 4(c)). After the injection is completed, retaining pressure in the cylinder 12 is switched. On such basis, one molding injection is completed, and a resin product is formed in the gap 44 (FIG. 4(d)). Subsequently, the movable mold 42 is removed from the fixing mold 41, and the resin product is taken out of the gap 44 (FIG. 4(e)).

(Example of Changing to an Injection Condition that Corresponds to a Detected Viscosity Value)

FIG. 5(a) is a chart of an example of a viscosity change that occurs during each molding injection, and FIG. 5(b) is a chart of a relationship between a detected viscosity value and setting retaining pressure.

In the example shown in FIG. 5(a), a result of viscosity detection changes during each molding injection. A specified reference range related to the detected viscosity value is preset in the injection molding apparatus 1. If detected viscosity falls within the reference range, the controller 51 makes no change to a setting of an injection condition, regardless of the detected viscosity value. Therefore, resin is shot according to a same retained-pressure setting. On the other hand, if the detected viscosity value deviates from the reference range, the controller 51 changes a setting of an injection condition according to the detected viscosity value. On such basis, injection is performed at a different injection speed or different retaining pressure, for example.

In addition, a table that corresponds to the chart shown in FIG. 5(b) and that associates detected viscosity values with respective specified retaining pressure is prepared in the injection molding apparatus 1. In the table, viscosity falling within a reference range is associated with same retaining pressure. The controller 51 determines, by using detected viscosity with reference to the table, retaining pressure to be set. Moreover, if the retaining pressure determined according to the table is the same as a current specified value, a setting of the retaining pressure is not changed. On the other hand, if the retaining pressure determined according to the table is different from a current specified value, a setting of the retaining pressure is changed.

The present invention is not limited to the retaining pressure. For each parameter (such as an injection speed) that can be set for the injection molding apparatus 1 as the injection condition, a table that associates detected viscosity values with the parameter may be prepared in the injection molding apparatus 1.

A setting change to an injection condition that corresponds to the detected viscosity value may not be limited to one injection condition, and may be made by using multiple different temperature conditions as an object. For example, current setting values of the injection speed and the injection pressure may be respectively changed to optimal values that correspond to a detected viscosity value of resin that has not been shot.

(Example of Changing to a Temperature Condition that Corresponds to a Detected Viscosity Value)

FIG. 6(a) is a chart of an example of a change of a detected viscosity value change that occurs during each molding injection when a temperature condition is not changed, and FIG. 6(b) is a chart of an example of a change of a detected viscosity value that occurs during each molding injection when a temperature condition is changed.

In the example shown in FIG. 6(a), viscosity detected during each molding injection is controlled to fall within a range of approximately 14.5 Pa·S, and no significant increase in viscosity that is caused by an increases of a quantity of times of molding injection is observed. Therefore, according to detected viscosity values shown in FIG. 6(a) from the left to the right, the controller 51 does not change a temperature condition of the heater 15 according to the detected viscosity values.

In the example shown in FIG. 6(b), after molding injection at a specific moment, the detected viscosity value continuously increases in one-way during repeated molding injection, and is eventually controlled to fall within fixed values. That is, it may be observed that as the quantity of times of molding injection increases, the detected viscosity value increases from 14.5 Pa·S to 15.0 Pa·S. In this case, that is, in a specific time period (within a specific quantity of times of molding injection), when the detected viscosity value changes (increases or decreases) to a specified value, the controller 51 sets, for the heater 15, a temperature condition that corresponds to viscosity detected during current molding injection. Specifically, the temperature adjustment machine 54 is instructed to change a temperature of the heater 15 to a temperature that corresponds to the detected viscosity value. After receiving the indication, the temperature adjustment machine 54 controls the heater 15 until the temperature of the heater 15 changes to the indicated temperature.

Even if a temperature condition of the resin changes, it still takes some time for an actual temperature of the resin to reach a temperature that is after a setting change. Therefore, a setting change to a temperature condition that corresponds to the detected viscosity value is made only when the viscosity of the resin significantly changes. That is, as shown in FIG. 6(b), when the viscosity significantly changes with respect to a reference value, for example, when a change of 0.5 Pa·S or more occurs, the temperature condition is changed. On the other hand, the temperature condition is not changed even if a viscosity change less than the reference value in a short period occurs.

(Advantages of this Implementation Manner)

For most products, there is a relationship between quality and viscosity of resin during injection molding. For example, it is known that there is a definite correlation between a size of a product, which is one type of quality of the product, and the viscosity of the resin. If the viscosity of the resin is high, the product has a small size; otherwise, if the viscosity of the resin is low, the product has a large size. Moreover, a burr (an overflow defect of resin caused by excessively much filled resin), a shrink mark (a shrink defect of resin caused by insufficient filled resin), a flow mark (a cosmetic defect of a product caused by flowing of resin), and the like each also have a correlation with the viscosity of the resin. That is, if the viscosity of the resin changes, the quality of the products may be affected.

In the injection molding apparatus 1 in the implementation manner 1, viscosity of resin is detected before injection of the resin, and an injection condition during the injection is suitably changed according to a result of the detection. For example, if the viscosity of the resin becomes high, it is difficult for melt resin to flow, and it is difficult to transfer pressure during the injection to a rear end of the mold gap 44. As a result, the mold gap 44 may be filled with insufficient resin. Therefore, in the injection molding apparatus 1, if the viscosity is greater than a reference value, the resin is shot after settings of injection pressure and retaining pressure is changed to values greater than standard values. Therefore, even if the viscosity increases, a same fixed quantity of melt resin as that before the increase can be practically filled in the gap 44.

Otherwise, if the viscosity of the resin becomes low, melt resin flows easily. Therefore, excessively much pressure during the injection is probably transferred to a rear end of the mold gap 44. As a result, the mold gap 44 may be filled with excessively much resin. Therefore, in the injection molding apparatus 1, if the viscosity is less than a reference value, the resin is shot after settings of injection pressure and retaining pressure is changed to values less than standard values. Therefore, even if the viscosity decreases, a same fixed quantity of melt resin as that before the decrease can be practically filled in the gap 44.

A setting change to a temperature condition or an injection condition that corresponds to a detected viscosity value may not be made in real time. For example, a setting of the temperature condition or the injection condition during subsequent molding injection may be changed based on a result of viscosity detection of current filled resin. For example, for a detected viscosity value during each molding injection, detected values of a specific quantity of times (such as five times or the like) of molding injection may be averaged, and a temperature condition or an injection condition that corresponds to the average value is set for the injection molding apparatus 1.

Because the ultrasonic vibration portion 21 is in direct contact with resin filled in the gap in the cylinder 12, the injection molding apparatus 1 can detect viscosity of the filled resin before injection of the resin, and change a setting of a injection condition according to a result of the detection. Therefore, the viscosity of the resin can be detected in real time.

Moreover, the ultrasonic viscosity sensor 20 detects the viscosity of the resin in such a manner that the ultrasonic vibration portion 21 is in direct contact with the melt resin. Therefore, regardless of types of the resin, actual viscosity that corresponds to a physical status of object resin to be detected can be directly detected. Therefore, there is no need to obtain in advance various characteristics that are related to viscosity of resin used in injection molding. Therefore, the viscosity of the resin in the cylinder 12 can be easily detected without advance preparations. That is, compared with a injection molding machine 10 in the prior art that detects viscosity by emitting an ultrasonic wave, the injection molding machine 10 including the ultrasonic viscosity sensor 20 acting as an injection molding machine 10 that can detect viscosity of resin in real time has high practicality.

(Example of a Change)

An installation position of the ultrasonic viscosity sensor 20 in the injection molding machine 10 is not limited to the cylinder 12 shown in FIG. 1, and may be, for example, at a front end of the screw 11. The example is shown in FIG. 7(*a*) and FIG. 7(*b*).

Figure 7:
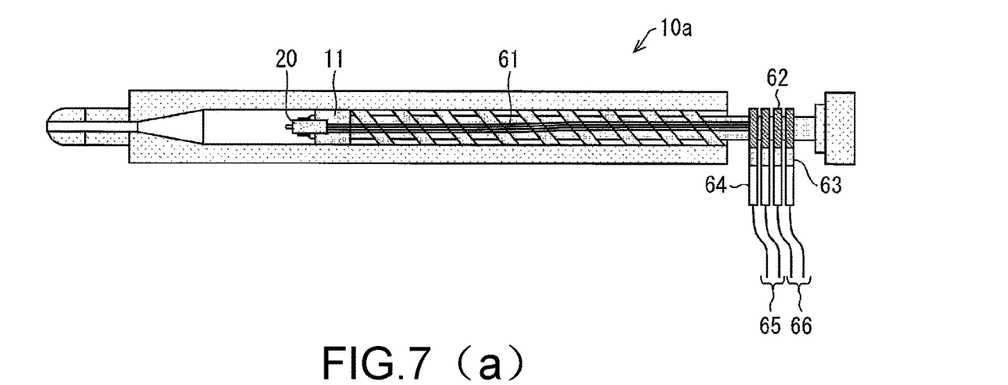
FIG. 7(a) is a diagram of a structure of an injection molding machine when an ultrasonic viscosity sensor is installed at a front end of a screw.
FIG. 7(b) is a diagram of a structure of an injection molding machine when an ultrasonic viscosity sensor is installed at a front end of a screw.

FIG. 7(*a*) is a diagram of a structure of an injection molding machine 10*a* when an ultrasonic viscosity sensor 20 is installed at a front end of a screw 11, and FIG. 7(*b*) is a diagram of a structure of an injection molding machine 10*b* when an ultrasonic viscosity sensor 20 is installed at a front end of a screw 11.

In addition to the components included by the injection molding machine 10, the injection molding machine 10*a* shown in FIG. 7(*a*) further includes an interior cable 61, a slip ring 62, an electrical brush 63, a terminal 64, a signal cable 65, and an electrical power cable 66. In the injection molding machine 10*a*, the ultrasonic viscosity sensor 20 is installed at the front end of the screw 11. An axis of an ultrasonic vibration portion 21 and an axis of the screw 11 are parallel with each other. The ultrasonic vibration portion 21 and the screw 11 are, as shown in FIG. 7(*a*) and FIG. 7(*b*), are in a shape of an elongated stick. Therefore, their axes refer to axes in a length direction.

Inside a cylinder 12, the interior cable 61 is configured along an outer surface of the screw 11. One end of the interior cable 61 is connected to the ultrasonic viscosity sensor 20, and the other end is connected to the slip ring 62. The interior cable includes the signal cable and the electrical power cable.

The slip ring 62 is installed on a side end of an installation position of a load cell 14 in the screw 11. Rings that constitute the slip ring 62 are in contact with corresponding electrical brushes 63. The electrical brushes are installed on corresponding terminals 64. Corresponding signal cable 65 or electrical power cables 66 are connected to the terminals 64.

The electrical brush 63, the terminal 64, the signal cable 65, and the electrical power cable 66 are fixed in an injection molding apparatus 1. On the other hand, the interior cable 61 and the slip ring 65 rotate as the screw 11 rotate. In this case, the rings that constitute the slip ring 62 rotate, and are in contact with the corresponding electrical brushes 63 at the same time. Therefore, the interior cable 61, the signal cable 65, and the electrical power cable 66 can be always communicated through the corresponding ring, electrical brush, and terminal. Moreover, the screw 11 and the interior cable 61 can rotate at the same time while their relative position relationship is kept. After the installation, the interior cable 61 is not twisted with the screw 11 during the rotation of the screw 11, and can supply power to the ultrasonic viscosity sensor 20, or can perform data communication with the ultrasonic viscosity sensor 20.

(Non-Contact Power Supply and Data Communication)

In addition to the components included by the injection molding machine 10, the injection molding machine 10*b* shown in FIG. 7(*b*) further includes an interior cable 71, a wireless transmitter 72, a wireless receiver 73, a powered-side coil 74, a feeding-side coil 75, a signal cable 76, and an electrical power cable 77. In the injection molding machine 10*b*, the ultrasonic viscosity sensor 20 is installed at the front end of the screw 11. An axis of an ultrasonic vibration portion 21 and an axis of the screw 11 are parallel with each other.

Inside a cylinder 12, the interior cable 71 is configured along an outer surface of the screw 11. One end of the interior cable 71 is connected to the ultrasonic viscosity sensor 20, and the other end is connected to the wireless transmitter 72 and the powered-side coil 74. The interior cable includes the signal cable and the electrical power cable.

In the injection molding machine 10*b*, the ultrasonic viscosity sensor 20 and the powered-side coil 74 are installed at ends of the screw 11. The feeding-side coil 75 and the powered-side coil 74 are spaced to a certain extend and are fixed in an injection molding apparatus 1. The electrical power cable 77 is connected to the feeding-side coil 75. The wireless receiver 73 is fixed at any position of the injection molding apparatus 1. A signal cable 76 is fixed to the wireless receiver 73.

Power supplied from a power supply through the electrical power cable 77 is transferred to the powered-side coil 74 through the feeding-side coil 75 in a non-contact power supply manner, and is supplied to the ultrasonic viscosity sensor 20 through the interior cable 71. Therefore, power is supplied to the ultrasonic viscosity sensor 20 located inside the cylinder 12.

A signal about a detection result of the ultrasonic viscosity sensor 20 is transferred to the wireless transmitter 72 through the interior cable 71, and is sent to the wireless receiver 73 by means of wireless communication. The wireless receiver 73 outputs the received wireless signal to the controller 51. Therefore, the controller 51 can be notified of viscosity and a temperature detection result obtained by the ultrasonic viscosity sensor 20 in the cylinder 12.

The wireless receiver 73, the electrical power cable 77, the powered-side coil 74, and the signal cable 76 are all fixed in the injection molding apparatus 1. That is, the wireless receiver 73, the electrical power cable 77, the powered-side coil 74, and the signal cable 76 do not rotate even if the screw 11 rotates. On the other hand, the interior cable 71, the wireless transmitter 72, and the powered-side coil 74 rotate as the screw 11 rotates. In this case, the powered-side coil 74 and the feeding-side coil 75 are always kept opposite to each other. Therefore, power supply to the ultrasonic viscosity sensor 20 is kept during the rotation of the screw 11.

Moreover, the screw 11 and the interior cable 71 can rotate at the same time while their relative position relationship is kept. Therefore, the interior cable 71 is not twisted with the screw 11 during the rotation of the screw 11, and can supply power to the ultrasonic viscosity sensor 20, or can perform data communication with the ultrasonic viscosity sensor 20.

In the injection molding machine 10a (10b) shown in FIG. 7(a) and FIG. 7(b), the axis of the ultrasonic vibration portion 21 is parallel with the axis of the screw 11. Therefore, a moving direction of resin when the resin is filled by the screw 11 becomes parallel with the axis of the ultrasonic vibration portion 21 (an axis in the length direction), and less pressure is applied to the ultrasonic vibration portion 21 during the filling of the resin. As a result, the viscosity of the resin can be detected more stably.

(Implementation Manner 2)

Figure 8:
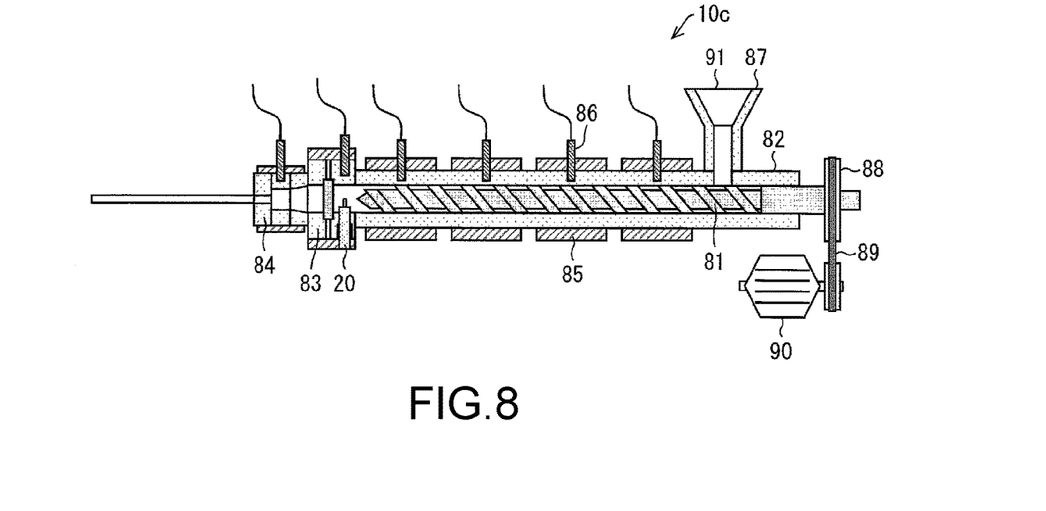
FIG. 8 is diagram of a structure of a molding machine according to an implementation manner 2 of the present invention.

The following describes the implementation manner 2 of the present invention with reference to FIG. 8.

FIG. 8 is diagram of a structure of a molding machine 10c according to the implementation manner 2 of the present invention. As shown in the figure, the extrusion molding machine 10c includes a screw 81 (pressurization portion), a cylinder 82, an adapter 83, a die 84, a heater 85, a thermocouple 86, a hopper 87, a pulley 88, a transferring belt 89, and a motor 90.

The extrusion molding machine 10c constitutes an extrusion molding apparatus not shown in the figure. That is, the extrusion molding apparatus including the extrusion molding machine 10c FIG. 8 also belongs to the scope of the present invention.

In the example shown in FIG. 8, the adapter 83 is installed at a front end of the cylinder 82, and further, the die 84 is installed at a front end of the adapter. The ultrasonic viscosity sensor 20 is installed on a side surface of the adapter 83. A gap for melt resin to be filled exist inside the screw 81, the adapter 83, and the die 84. An ultrasonic vibration portion 21 that constitutes the ultrasonic viscosity sensor 20 is configured by protruding into the gap. Therefore, the resin is filled in the gap in the adapter 83, the resin comes into contact with the ultrasonic vibration portion 21.

Multiple heaters 15 are installed on outside the cylinder 82. A temperature of filled resin in the cylinder 82 may be adjusted by controlling a temperature of the heater 15.

The screw 81 is configured inside the cylinder 82. A front end of the screw 81 faces the adapter 83. A pulley 88 is provided on the screw 81. A front end of the screw 81 faces the adapter 83. The pulley 88 is provided with the transferring belt 89, and the transferring belt 89 is also provided on another pulley connected to the motor 90. By driving the motor 90, when the pulley on a side of the motor 90 rotates, the rotation force is transferred to the pulley 88 by using the transferring belt 89, and therefore, the screw 81 to which the pulley 88 is fixed can rotate.

A resin pellet 91 is injected into the cylinder 82 through the hopper 87, to enable the heater 15 to heat resin at the same time when the screw 81 is made to rotate clockwise. On such basis, extrusion molding starts, and pressure is applied to the resin for releasing the melt resin to the outside of the cylinder 82. As a result, the resin is extruded out of the cylinder 82 through the gap inside the cylinder 82, the adapter 83, and the die 84.

In this way, the "extrusion" in this implementation manner means constantly releasing melt resin injected into the cylinder 82 to the outside of the cylinder 8 by using pressure. In this case, the released resin is kept converged and does not fly apart. That is, the "extrusion of the resin" in this implementation manner is equivalent to a concept of, specifically for example, the "releasing of the resin".

In the extrusion molding machine 10c shown in FIG. 8, a resin product in a specified shape such as an electric wire or a film can be generated by means of constant extrusion molding. During the extrusion molding, a setting of a temperature condition or an extrusion condition during the extrusion molding can be suitably changed according to viscosity that is regularly detected (for example, detected at an interval of one millisecond to one minute).

For example, when the detected viscosity is low (that is, the resin is soft), the temperature of the heater 15 is adjusted down by 1° C. to 2° C. On the other aspect, when the detected viscosity is high (that is, the resin is hard), the temperature of the heater 15 is adjusted up by 1° C. to 2° C. In this way, the temperature of the heater 15 is controlled according to the detected viscosity. Therefore, viscosity of melt resin in the cylinder 82 can be kept to a value within a fixed range, and quality of a product is stable.

In FIG. 8, the ultrasonic viscosity sensor 20 is installed on the adapter 83, but the present invention is not limited thereto. The ultrasonic viscosity sensor 20 may be installed on the cylinder 82 as FIG. 1 or may be installed at the front end of the cylinder 82 as FIG. 7(a) and FIG. 7(b). Alternatively, the ultrasonic viscosity sensor 20 may be installed on the die 84. However, the ultrasonic vibration portion 21 that constitutes the ultrasonic viscosity sensor 20 needs to be configured in the gap in the cylinder 82, the adapter 83, or the die 84, and needs to be physically in contact with the melt resin filled in the gap.

The present invention is not limited to the implementation manners, and various modifications can be made to the present invention without departing from the scope of the claims. Implementation manners obtained by combining the technical components disclosed in the different implementation manners shall also fall within the technical range of the present invention. New technical features may also be obtained by combining the technical components disclosed in the implementation manners.

What is claimed is:

1. A molding machine, comprising:
   a cylinder;
   a nozzle, connected to a front end of the cylinder;
   at least one heater, externally attached to a cylindrical wall of the cylinder;
   a pressurization portion, applying pressure to resin for releasing the resin filled in the cylinder to the outside of the cylinder; and
   an ultrasonic viscosity sensor, penetrating through the cylindrical wall of the cylinder and located directly adjacent to the at least one heater, the ultrasonic viscosity sensor comprising a base, an oscillator embedded in the base, and an ultrasonic vibration portion installed on one end of the oscillator and in contact with the resin filled in the cylinder, wherein the ultrasonic vibration portion protrudes from the base into a gap filled with the resin in the cylinder, such that the ultrasonic vibration portion is physically and directly in contact with the resin, wherein a front end of the pressurization portion does not intersect with a vertical projection of the ultrasonic vibration portion of the ultrasonic viscosity sensor that is in contact with the resin filled in the cylinder.

2. The molding machine according to claim 1, wherein the molding machine is an injection molding machine.

3. A control apparatus, configured to control the molding machine according to claim 1, the control apparatus comprising:

a setting portion, setting a releasing condition that corresponds to viscosity of the resin detected by the ultrasonic viscosity sensor.

4. The control apparatus according to claim 3, wherein the setting portion sets at least any one of a releasing speed, releasing pressure, retaining pressure, and a pressure retaining time in the releasing condition to a value that corresponds to the detected viscosity of the resin.

5. The control apparatus according to claim 3, wherein the releasing condition is set before the resin is released, according to viscosity of the resin detected at any occasion that is after measurement of the resin by the molding machine and that is before the releasing of the resin.

6. A molding apparatus, comprising:

the molding machine according to claim 1, and a control apparatus, configured to control the molding machine, wherein the control apparatus comprising:

a setting portion, setting a releasing condition that corresponds to viscosity of the resin detected by the ultrasonic viscosity sensor.

* * * * *